(12) United States Patent
Rediger et al.

(10) Patent No.: US 8,003,214 B2
(45) Date of Patent: Aug. 23, 2011

(54) WELL TREATING MATERIALS COMPRISING COATED PROPPANTS, AND METHODS

(75) Inventors: Richard Rediger, Conyers, GA (US); Michael J. Aron, Snellville, GA (US); Bedford W. Fennell, Sharpsburg, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 583 days.

(21) Appl. No.: 11/456,897

(22) Filed: Jul. 12, 2006

(65) Prior Publication Data

US 2008/0011477 A1 Jan. 17, 2008

(51) Int. Cl.
*B32B 5/16* (2006.01)
*B05D 7/00* (2006.01)
*E21B 43/01* (2006.01)

(52) U.S. Cl. ........ 428/407; 427/214; 427/220; 427/221; 427/222; 166/305.1; 166/308.1; 166/308.2; 166/310

(58) Field of Classification Search .................. 428/403, 428/407; 427/214, 220, 221, 222; 166/305.1, 166/308.1, 308.2, 310
See application file for complete search history.

(56) References Cited

U.S. PATENT DOCUMENTS

| | | | |
|---|---|---|---|
| 3,815,680 A | 6/1974 | McGuire et al. |
| 3,929,191 A | 12/1975 | Graham et al. |
| 4,073,343 A | 2/1978 | Harnsberger |
| 4,160,483 A | 7/1979 | Thomas et al. |
| 4,183,813 A | 1/1980 | Black et al. |
| 4,222,444 A | 9/1980 | Hamilton |
| 4,336,842 A | 6/1982 | Graham et al. |
| 4,439,489 A | 3/1984 | Johnson et al. |
| 4,493,875 A | 1/1985 | Beck et al. |
| 4,518,040 A | 5/1985 | Middleton |
| 4,527,627 A | 7/1985 | Graham et al. |
| 4,547,468 A | 10/1985 | Jones et al. |
| 4,569,394 A | 2/1986 | Sweatman et al. |
| 4,585,064 A | 4/1986 | Graham et al. |
| 4,665,990 A | 5/1987 | Perlman |
| 4,852,650 A | 8/1989 | Jennings et al. |
| 4,869,960 A | 9/1989 | Gibb et al. |
| 4,888,240 A | 12/1989 | Graham et al. |
| 4,923,714 A | 5/1990 | Gibb et al. |
| 5,005,641 A | 4/1991 | Mohaupt |
| 5,128,390 A | 7/1992 | Murphey et al. |
| 5,188,175 A | 2/1993 | Sweet |
| 5,217,074 A | 6/1993 | McDougall et al. |
| 5,311,946 A | 5/1994 | Harry et al. |
| 5,316,792 A | 5/1994 | Harry et al. |
| 5,318,382 A | 6/1994 | Cahill |
| 5,330,005 A | 7/1994 | Card et al. |
| 5,370,184 A | 12/1994 | McDougall et al. |
| 5,411,093 A | 5/1995 | Jennings, Jr. |
| 5,422,183 A | 6/1995 | Sinclair et al. |
| 5,425,994 A | 6/1995 | Harry et al. |
| 5,439,055 A | 8/1995 | Card et al. |
| 5,492,178 A | 2/1996 | Nguyen et al. |
| 5,500,174 A | 3/1996 | Scott |
| 5,501,274 A | 3/1996 | Nguyen et al. |
| 5,501,275 A | 3/1996 | Card et al. |
| 5,520,250 A | 5/1996 | Harry et al. |
| 5,578,371 A | 11/1996 | Taylor et al. |
| 5,582,249 A | 12/1996 | Caveny et al. |
| 5,639,806 A | 6/1997 | Johnson et al. |
| 5,656,176 A | 8/1997 | Scott |
| 5,697,440 A | 12/1997 | Weaver et al. |
| 5,728,302 A | 3/1998 | Connor et al. |
| 5,775,425 A | 7/1998 | Weaver et al. |
| 5,787,986 A | 8/1998 | Weaver et al. |
| 5,833,000 A | 11/1998 | Weaver et al. |
| 5,837,656 A | 11/1998 | Sinclair et al. |
| 5,839,510 A | 11/1998 | Weaver et al. |
| 5,853,048 A | 12/1998 | Weaver et al. |
| 5,916,933 A | 6/1999 | Johnson et al. |
| 5,929,437 A | 7/1999 | Elliott et al. |
| 5,948,734 A * | 9/1999 | Sinclair et al. ............... 507/219 |
| 5,955,144 A * | 9/1999 | Sinclair et al. ............... 427/214 |
| 5,964,291 A * | 10/1999 | Bourne et al. ............... 166/279 |
| 6,017,854 A | 1/2000 | Van Slyke |
| 6,047,772 A | 4/2000 | Weaver et al. |
| 6,059,034 A | 5/2000 | Rickards et al. |
| 6,114,410 A | 9/2000 | Zbetzold |
| 6,116,342 A | 9/2000 | Clark et al. |
| 6,209,643 B1 | 4/2001 | Nguyen et al. |
| 6,330,916 B1 | 12/2001 | Rickards et al. |
| 6,364,018 B1 | 4/2002 | Brannon et al. |
| 6,406,789 B1 | 6/2002 | McDaniel et al. |

(Continued)

FOREIGN PATENT DOCUMENTS

CA 1057649 A1 7/1979

(Continued)

OTHER PUBLICATIONS

COOL-LOK 250F Hot Melt, National Starch & Chemical, 2000.*

(Continued)

*Primary Examiner* — H. (Holly) T Le
(74) *Attorney, Agent, or Firm* — Michael S. Kerns

(57) ABSTRACT

The present invention is directed to an improved thermoplastic material-coated particulate composition useful for hydraulic fracturing treatments, gravel packing for sand control or other well formation treatments and especially the related methods of its use and is particularly directed to using a thermoplastic material as part of a particulate composition in a method for enhancing the stabilization of and reducing particulate flowback and fines transport in a well formation.

30 Claims, No Drawings

U.S. PATENT DOCUMENTS

| | | | |
|---|---|---|---|
| 6,439,309 B1 | 8/2002 | Matherly et al. | |
| 6,528,157 B1 | 3/2003 | Hussain et al. | |
| 6,582,819 B2 | 6/2003 | McDaniel et al. | |
| 6,626,241 B2 | 9/2003 | Nguyen | |
| 6,632,527 B1 | 10/2003 | McDaniel et al. | |
| 6,732,800 B2 | 5/2004 | Acock et al. | |
| 6,749,025 B1* | 6/2004 | Brannon et al. | 166/305.1 |
| 6,817,414 B2 | 11/2004 | Lee | |
| 6,832,650 B2 | 12/2004 | Nguyen et al. | |
| 6,892,813 B2 | 5/2005 | Nguyen et al. | |
| 7,073,581 B2 | 7/2006 | Nguyen et al. | |
| 7,153,575 B2* | 12/2006 | Anderson et al. | 428/407 |
| 7,210,528 B1 | 5/2007 | Brannon et al. | |
| 7,244,492 B2* | 7/2007 | Sinclair et al. | 428/325 |
| 7,270,879 B2* | 9/2007 | McCrary | 428/402 |
| 7,426,961 B2* | 9/2008 | Stephenson et al. | 166/280.2 |
| 7,491,444 B2* | 2/2009 | Smith et al. | 428/402 |
| 7,624,802 B2 | 12/2009 | McCrary et al. | |
| 7,713,918 B2 | 5/2010 | Stephenson et al. | |
| 7,754,659 B2* | 7/2010 | Rediger et al. | 507/269 |
| 2003/0205376 A1 | 11/2003 | Ayoub et al. | |
| 2003/0224165 A1 | 12/2003 | Anderson et al. | |
| 2004/0040708 A1 | 3/2004 | Stephenson et al. | |
| 2004/0094300 A1 | 5/2004 | Sullivan et al. | |
| 2004/0200617 A1 | 10/2004 | Stephenson et al. | |
| 2005/0019574 A1* | 1/2005 | McCrary | 428/403 |
| 2005/0028979 A1 | 2/2005 | Brannon et al. | |
| 2005/0059558 A1 | 3/2005 | Blauch et al. | |
| 2005/0096207 A1 | 5/2005 | Urbanek | |
| 2006/0035790 A1* | 2/2006 | Okell et al. | 507/269 |
| 2006/0037755 A1 | 2/2006 | Knobloch | |
| 2006/0078682 A1 | 4/2006 | McDaniel et al. | |
| 2006/0146643 A1 | 7/2006 | Allen | |
| 2007/0054121 A1 | 3/2007 | Weintritt et al. | |
| 2008/0011477 A1 | 1/2008 | Rediger et al. | |
| 2008/0202750 A1* | 8/2008 | Rediger et al. | 166/280.2 |
| 2008/0277115 A1 | 11/2008 | Rediger et al. | |
| 2008/0283243 A1 | 11/2008 | Rediger et al. | |

FOREIGN PATENT DOCUMENTS

| | | |
|---|---|---|
| CA | 1185778 | 4/1985 |
| CA | 1202882 | 4/1986 |
| CN | 1508390 A | 6/2004 |
| CN | 1730422 A | 2/2006 |
| EP | 0169412 A1 | 1/1986 |
| EP | 1400818 A2 | 3/2004 |
| EP | 0308257 A2 | 11/2008 |
| GB | 2050467 A | 1/1981 |
| GB | 2370054 A | 6/2002 |
| GB | 2426023 A | 11/2006 |
| WO | 99/27229 A1 | 6/1999 |
| WO | WO00/05302 | 2/2000 |
| WO | 03/011588 A1 | 2/2003 |
| WO | 03/023177 A2 | 3/2003 |
| WO | 03/089757 A1 | 10/2003 |
| WO | 2004/083600 A1 | 9/2004 |
| WO | WO 2004/083600 | 9/2004 |
| WO | WO2004/092254 | 10/2004 |
| WO | 2005/000993 A1 | 1/2005 |
| WO | 2005/095202 A1 | 10/2005 |
| WO | 2006/034298 A2 | 3/2006 |
| WO | 2008/033225 A2 | 3/2008 |

OTHER PUBLICATIONS

International Search Report for PCT/US2007/072212 mailed on Nov. 27, 2007.
Conductivity Endurance Technology, Top Technology Solutions 2006, 2006 Halliburton, H04898, Apr. 2006.
Advances in Coalbed Methane, Hart Energy Publications, Chemical Week Associates, May 2003.
Currently pending U.S Appl. No. 11/747,359, filed May 11, 2007.
Currently pending U.S. Appl. No. 11/803,688, filed May 15, 2007.
Advances in Coalbed Methane, Hart Energy Publications, Chemical Week Associates, May 2003, pp. 1-16, Hart Publications, Houston, Texas, USA.
International Search Report for PCT/US2008/062890, mailed Sep. 1, 2008, European Patent Office, Rijswijk, Netherlands.
International Search Report for PCT/US2008/063055, mailed Sep. 2, 2008, European Patent Office, Rijswijk, Netherlands.
International Search Report and Written Opinion of the International Searching Authority for PCT/US09/36326, mailed Jun. 26, 2009, nine pages, European Patent Office, Rijswijk, Netherlands.
Written Opinion of the International Searching Authority for PCT/US07/72212, mailed Nov. 27, 2007, six pages, European Patent Office, Rijswijk, Netherlands.
International Search Report and Written Opinion of the International Searching Authority for PCT/US08/62890, mailed Aug. 1, 2008, six pages, European Patent Office, Rijswijk, Netherlands.
International Search Report and Written Opinion of the International Searching Authority for PCT/US08/63055, mailed Aug. 13, 2008, seven pages, European Patent Office, Rijswijk, Netherlands.
"Density of Various solids", CRC Handbook of Chemistry and Physics, 90th edition, 2009-2010, section 15, p. 39.

* cited by examiner

WELL TREATING MATERIALS COMPRISING COATED PROPPANTS, AND METHODS

FIELD OF THE INVENTION

The present invention is directed to improved particulate compositions useful for hydraulic fracturing treatments, gravel packing for sand control or for other well formation treatments and is especially directed to the related methods for their use. The invention is particularly directed to using a thermoplastic material and especially a hot melt adhesive as part of a particulate composition (coated proppant) in a method for enhancing the stabilization of and reducing particulate flowback and fines transport in a well formation. The coated proppant exhibits a latent tackiness that aids in the ease of handling of this product prior to down well placement where aggregation then occurs.

BACKGROUND OF THE INVENTION

Particulate solids are introduced into well formations for a variety of purposes. In hydraulic fracturing operations, particulate proppants are carried into fractures created in the subterranean rock formation by hydraulic pressure. Proppants suspended in a fracturing fluid are carried into the fractures and upon releasing the fracture pressure, the proppants remain in the fractures holding the separated rock formation apart to create channels for the flow of formation fluids, e.g., hydrocarbons including natural gas and oil, back to the well bore and ultimately to the well head.

It also is common to place particulate material in the area surrounding a well bore to maintain permeability and control sand entrainment. Such gravel packs, as they are called, act as filters to restrict the flow of fines and formation sand with the hydrocarbon fluid into the well bore. Typically, gravel or sand having a mesh size between 10 and 60 mesh on the U.S. Standard Sieve Series is placed in the region adjacent to the well bore; these particles may be bonded together using a thermosetting resin composition.

Notwithstanding these techniques and often as a consequence of them, particulate solids are generated during the operation of a well that are sufficiently buoyant to be transported by the formation fluid (hydrocarbon) as part of the recovery effort. For example, the nature of the formation itself may be populated with particles sufficiently small to be entrained in the formation fluid. When these transported particulates remain in the formation fluid recovered at the well head, premature wearing of the hydrocarbon production equipment becomes a problem. Such particulates also can clog the well bore significantly reducing, if not halting, the well's production rate. Eventually, the solids must be removed from the fluid adding additional cost to the recovery operation.

Proppant flowback is one example of this phenomenon in which the proppant itself is dislodged from the fracture and becomes entrained in the formation fluid (hydrocarbon) as it is recovered from the well. As noted above, the entrained solids can cause undue wear on the production equipment and in severe cases can also reduce formation conductivity.

The longstanding nature of this problem has engendered a wide variety of potential solutions.

One of the most common approaches to reduce proppant flowback has been to employ thermoset (cured) resin-coated or thermosetting (curable) resin-coated proppants. Typical resins include epoxy resins and phenol-formaldehyde resins. In this approach, exemplified for example in U.S. Pat. No. 4,336,842, U.S. Pat. No. 5,128,390 and U.S. Pat. No. 5,639,806, the resin-coated proppant is introduced into the formation. In the case of the curable resin-coated proppants, the pressure encountered in the formation fractures causes the thermosetting resin-coated proppant to agglomerate or bridge one-to-another and the attendant heat causes the resin to cure-in-place. Upon curing, the consolidated nature of the agglomerated proppants fix the material in-place.

U.S. Pat. No. 4,869,960 describes using a cured novolac epoxy resin for coating the proppant.

Another approach is described in U.S. Pat. Nos. 5,330,005; 5,439,055 and 5,501,275 where fibers are added into the formation in hopes that they form a mat or framework structure that helps to hold particulates in place and reduce flowback.

U.S. Pat. No. 5,501,274 describes adding a thermoplastic material, such as a polyolefin, polyamide, polyvinyl or cellulose derivative, in individual particulate, ribbon or flake form along with the proppant in an amount of 0.01% to 15% by weight of the proppant. Once the proppant and separate elements of the thermoplastic material lodge in the formation, softening of the thermoplastic material occurs causing bridging between proppant particles and the separate particles of the thermoplastic material, leading to the formation of agglomerates. These agglomerates hopefully create a framework structure in the formation, much like the cured-in-place thermosetting resin coated proppants, retarding flowback from the formation. According to U.S. Pat. No. 5,582,249 the thermoplastic material can be coated with an adhesive. According to U.S. Pat. No. 5,697,440, the thermoplastic material may also be an elastomeric material, also in individual particulate, ribbon or flake form is added with the proppant. As above, the elastomeric material preferably softens at the temperature encountered in the formation so that the elastomeric particulates, ribbons or flakes adhere to the proppant.

In U.S. Pat. Nos. 5,330,005, 5,439,055 and 5,501,275 a fibrous material is added to the treating fluid having suspended therein the particulate solids (e.g., proppant) and the treating fluid is introduced into the subterranean formation. It is suggested that the fibers act to bridge across constrictions and orifices in the proppant pack. The bridging forms a mat or framework that holds particulates in place and limits flowback.

U.S. Pat. Nos. 5,775,425, 5,787,986, 5,833,000, 5,839,510, 5,853,048, 6,047,772 and 6,209,643 use a tackifying compound for coating at least a portion of the particulates introduced into a formation. The tackifying compound causes particulates adjacent the coated material to agglomerate and create a framework structure in the formation. The '510 patent also includes a hardenable resin in the formulation so that curing of the resin then acts to fix that agglomerated structure in-place. The tackifying compound is a liquid or a solution that partially coats the particulate substrate prior to or subsequent to placement of the particulate in the formation. The tackifying compound forms part of the treatment fluid suspension for delivering the particulates into the formation. Specific examples of a tackifying compound include polyamides and liquids and solutions of polyesters, polycarbamates, polycarbonates and natural resins such as shellac. A main drawback of this method is that the coating of the tackifier must be done at the well site or the tackifier must be transported to the well as a slurry. Once the tackifier is applied to the proppant, the proppant is no longer free-flowing.

In U.S. Pat. No. 6,832,650, reticulated foam fragments are mixed into the treating fluid along with the particulate material (proppant) as a way of reducing or preventing the flow-back of solids into the recovered fluid.

Notwithstanding these various approaches, the interest in developing new solutions to the problem of particulate generation and transport in well recovery operations remains strong. Choosing the correct proppant remains an important aspect of successful well stimulation and recovery operations.

DETAILED DESCRIPTION OF THE INVENTION

The present invention is based on using thermoplastic materials as a coating on particulates (proppants) used in connection with well drilling operations and the attendant recovery of hydrocarbons from subterranean formations and especially in connection with propped fracturing procedures, with gravel packing and with other formation treatments. The thermoplastic coating provides the proppant with latent tackiness, such that the tackiness of the coating does not develop until the proppant is placed into the hydrocarbon-bearing formation.

Thus, according to one embodiment of this invention, a subterranean formation is stimulated by injecting a treating fluid into the subterranean formation to create a fracture in the subterranean formation. Either by including the thermoplastic-coated particulate (proppant) material of the present invention in the initial treating fluid, or by injecting a separate stream of treating fluid containing the thermoplastic-coated particulate (proppant) material of the present invention into the subterranean formation following the initial fracturing operation, treating fluid with the suspended thermoplastic-coated particulate material is injected into the subterranean formation such that the coated particulate material is deposited in the fracture, the thermoplastic coating thereafter fuses causing the sticky material (adhesive) to produce agglomerates as particulates bridge one-to-another thus forming a stable framework within the fracture to provide a fluid permeable region within the subterranean formation.

According to another embodiment, the thermoplastic-coated particulate material of the invention can also be used in connection with gravel packing procedures in which a screening device is placed in a wellbore. In one approach, a treating fluid with the coated particulate material of this invention suspended in it is injected into the wellbore in a way that causes the particulate material to pack around the exterior of the screening device. The packed coated particulate material then acts as a fluid-permeable barrier around the screening device for reducing or preventing the migration of formation particulates through to the screening device. In another approach, a prepacked screening device is used in which a fluid-permeable particulate bed containing the coated particulate material of the present invention is positioned between a fluid-permeable screen and a conduit wall defining the wellbore wherein the coating has been fused forming agglomerates as particulates bridge one-to-another thus creating a stable framework of a fluid permeable region.

In one preferred embodiment of the present invention, a subterranean formation is treated in a way that reduces or prevents particulate solid flow-back and the transport of formation fines from the subterranean formation as part of the recovered subterranean formation fluid (e.g., petroleum). According to this embodiment, particulate solids (proppant particles) having at least a partial coating of the thermoplastic material are suspended in a treating fluid. The treating fluid containing these coated suspended solids then is introduced into the subterranean formation so as to deposit the coated particulate solids at the desired location in the formation.

Thermal energy in the subterranean formation causes the thermoplastic material coating to fuse sufficiently to cause the particulates to agglomerate in the formation and form a stable framework of sufficient permeability for the recovered subterranean formation fluid (e.g., petroleum), to flow though the formation, with the so-formed agglomerates reducing or preventing the flow-back of particulate solids and the transport of other formation fines with the recovered formation fluid.

Another embodiment of the invention relates to a method of fracturing a subterranean formation in which a fracturing fluid having the thermoplastic-coated proppant particles are suspended therein. The fracturing fluid with the at least partially coated proppant particles suspended therein then is introduced into the subterranean formation at a rate and pressure sufficient to extend fractures in the subterranean formation. Thereafter, the at least partially coated proppant particles are deposited in the subterranean formation and thermal energy in the formation causes such partially coated proppant particles to agglomerate in the fashion described above, whereby the agglomerated proppant particles form a stable framework of sufficient permeability for the recovered subterranean formation fluid (e.g., petroleum), to flow through the formation, but sufficient to reduce or prevent the flow-back of the proppant particles and the transport of formation fines from the subterranean formation with the recovered formation fluid upon producing fluids from the formation.

In another embodiment, the thermoplastic coated proppant has an outer coating or shell of a cured thermosetting resin. The thermoset coating envelopes the inner thermoplastic coating and protects it from contributing to particle agglomeration until the outer shell fractures exposing the inner thermoplastic material, which material than exhibits the desired tackiness in the formation. The overall structure, thus, can be said to have a latent tackiness because the outer themoset shell makes the proppant free-flowing until that shell is broken to expose the inner tacky thermoplastic material.

Whether used in a formation fracturing operation, in a gravel packing operation, or in some other hydrocarbon recovery-related application, the particulate material of the present invention will generally be referred to herein as a proppant.

Suitable thermoplastic materials for use in providing the coating on the particulate (proppant) material in accordance with the present invention are those materials having a thermal transition point temperature (TTPT) (e.g., melt point or softening point), i.e., the temperature at which the material is able to flow and exhibit adhesive characteristics and become sticky or tacky, in the range of the temperatures encountered in the subterranean formation, and typically in the range of 30 to 120° C. The softening point of a potentially useful thermoplastic material may be determined using such apparatus as a ring and ball, or a capillary melt point instrument, as known to those skilled in the art.

At temperatures below the TTPT, i.e., under ambient temperature conditions, the coated particulate material is free flowing and can be packaged, transported to and handled at the well head without the need for any specialized equipment or skilled labor. Also, in the embodiment in which a cured outer thermoset shell envelopes the thermoplastic layer, the underlying tacky layer is protected, providing a proppant that is free-flowing. Thus, there is no need for pre-mixing of any ingredients for creating the proppant composition, or for introducing a separate formulation of ingredients along with a proppant for causing the formation of a fix-in-place proppant composition in situ. As described below, the adhesive character of the coating is not developed until the thermoplastic-coated particulates are delivered into, for placement in, the subterranean formation.

Thus, in accordance with the present invention, the adhesive character (or tackiness) of the coating is considered to be latent and the proppant is said to exhibit latent tackiness. The tackiness is not developed until the proppant has been placed into the formation. As the thermoplastic material-coated particulate is delivered to the well site and later pumped into the subterranean formation, the coated particulates are free-flowing. It is the heat and pressure encountered in the formation that causes the thermoplastic material of the coating to soften. This softening at and above the TTPT of the thermoplastic material of the coating allows the resin to flow under the conditions in the formation and form bonds with adjacent particulates, both those naturally in the formation (such as sand) and those introduced as part of the fracturing process, along with the surrounding rock formation itself. Such bonding locks the particulates in place in the formation preventing them from flowing back out with the recovered formation fluid. The adhesive character of the coating also serves to trap and thus minimize the passage of formation solids with the recovered fluid.

In the alternative embodiment, having a outer thermoset coating surrounding the thermoplastic, not until pressure from the formation causes the hard outer shell to fracture and thus expose the inner thermoplastic material is the tackiness developed. At this point the thermoplastic material can flow and cause agglomeration with adjacent particulates.

Because of this latent adhesive property, which is not developed until the coated particulates are present in the formation, the coated particulates of the present invention are better able to reach the desired location in the well (and flow as far from the well bore as possible) before their adhesive character is activated by the thermal conditions (and pressure conditions) in the formation.

Another important benefit of this latent adhesive property is that following the coating of the proppant at the manufacturing point, the coated proppant remains free-flowing. Thus, the proppant may be transported and handled the same as conventional coated proppants and does not need to be handled as a slurry. In addition, the need for separately applying an adhesive component or tackifying agent at the wellhead as the proppant is being pumped down into the well is eliminated. By eliminating this extra handling step, one eliminates its associated expense.

Thermoplastic materials suitable for possible use as the coating material in accordance with the present invention, broadly include polyethylene; polypropylene; SIS (styrene-isoprene-styrene) copolymers; ABS copolymers (i.e., acrylonitrile-butadiene-styrene); SBS (styrene-butadiene-styrene) copolymers; polyurethanes; EVA (ethylene vinyl acetate) copolymers; polystyrene; acrylic polymers; polyvinyl chloride and other similar fluoroplastics; pine rosins and modified rosins, such as rosin esters including glycerol rosin esters and pentaerythritol rosin esters; polysulfide; EEA (ethylene ethyl acrylate) copolymers; styrene-acrylonitrile copolymers; nylons, phenol-formaldehyde novolac resins, waxes and other similar materials and their mixtures. Particularly preferred for use as the thermoplastic material are those substances commonly referred to as hot melt adhesives. For example, hot melt adhesives such as Opt-E-Bond™ HL0033 manufactured by the HB Fuller Company, and Cool-Lok™ 34-250A manufactured by National Adhesives can be used in the present invention. Opt-E-Bond™ HL0033 is a hot melt adhesive containing polyethylene wax, while Cool-Lok™ 34-250A is a hot melt adhesive containing EVA, paraffin wax, and a tackifier. Other options are the pine rosins and modified rosins marketed by Georgia-Pacific as NOVARES® 1100 and NOVARES® 1182. NOVARES® 1100 is a pentaerythritol ester of tall oil rosin and has a softening point in the range of about 96-103° C., while NOVARES® 1182 is a glycerol ester of tall oil rosin and has a softening point in the range of about 80-88° C.

Hot melt adhesives are unique in that they can be made from a mixture of thermoplastic resins, such as a pine rosin along with a suitable wax to tailor the latent tackiness character of the resulting coated particulate. As understood by those skilled in the art, the amount and type of wax one uses to blend with the rosin are used to modify and regulate the overall softening point of the mixture. The wax also has an added benefit in that it produces a coating on the proppant that has good lubricity or flowability. This characteristic aids the handling and movement of the coated proppant from manufacturing, through transport and finally within the slurry mixing equipment at the well site. Once the proppant is placed in the formation, the wax, which is hydrocarbon in nature, also may be slowly dissolved by the hydrocarbons in the formation as they are extracted from the formation. This dissolution will tend to leave the proppant with a roughened surface which will further aid in preventing flowback of fines.

The thermoplastic material is provided as at least a partial coating on the particulate solids (proppant). Typically, the thermoplastic material is present on the particulates in an amount in the range of from 1% to 8% by weight of the particulate solids that are mixed with the treating fluid. More usually, the thermoplastic material is present in an amount of 4% to 6% by weight. The thickness of the coating on individual particles is generally in the range of between 0.5 and 3 mils.

The present invention is not limited to any particular kind of particulate solid for use as the proppant substrate (before providing the particulate solid with the coating of thermoplastic material in accordance with the present invention) for introduction into the well with the treating fluid, so long as the material has a sufficient strength property to withstand the stresses encountered in the anticipated oil and gas recovery application. The present invention is particularly suitable for use with conventional proppants and gravel packing materials. Thus, as commonly encountered in well treatment and recovery operations, graded sand, resin coated sand, ceramic materials including porous ceramic materials, sintered bauxite materials, glass materials, metal beads, certain polymeric materials, walnut hulls and similar materials can be used to advantage in accordance with the present invention. The particulate solids are generally included in the treating fluid in an amount in the range of from about 0.5 to about 8 pounds of particulate solids per gallon of the treating fluid.

The particulate material that is provided with at least a partial coating of thermoplastic material in accordance with the present invention typically has a particle size distribution in the range of about 8 mesh to 100 mesh (mesh size according to the U.S. Standard Sieve Series). In particular, at least 90% by weight of the particulate material added to the treating fluid should have a particle size falling within this range. Preferably at least 95% by weight of the particulate material has a size falling within the noted range. In more preferred embodiments, the particulate material has a particle distribution size in the range of 20 mesh to 40 mesh. Normally, there should be less than 5% by weight of particles having a size of less than 20 mesh or greater than 50 mesh and it is preferred that most embodiments have no particles less than 10 mesh or greater than 40 mesh.

While any particulate material commonly used as proppants for treating well bores, such as frac sand and the like, can be used as the particulate substrate for the present invention, proppant materials having a lower specific gravity generally are preferred since they can be carried farther into a formation than proppants of a higher specific gravity. Lower specific gravity proppants also usually simplify the chemistry of the treating fluid for providing a suitable suspension and may allow operation at lower pumping pressures.

In particularly preferred embodiments, the particulate material consists of porous ceramic or porous polymer particles. Porous ceramic particulates or porous polymeric particulates of the type described in U.S. Patent Publications 2004/0040708 and 2004/0200617 (the disclosures of which are incorporated herein by reference in their entirety) are particularly suitable. Such materials may be of natural origin or may be synthetically produced. Preferably the apparent specific gravity of such materials is less than 2.7 and preferably is less than 2.2.

As described in these publications, the internal porosity of such particulates is generally from about 10 to 75 volume percent. One way of determining the porosity is by using a commercially available instrument, such as ACCUPYC 1330 Automatic Gas Pycnometer (Micromeritics, Norcross, Ga.), that uses helium as an inert gas along with the manufacturer's recommended procedure for determining the internal porosity of the particulates. As described in these publications, the porous particulates may have either an inherent or induced permeability, i.e., individual pore spaces within the particle are interconnected so that fluids are capable of at least partially moving through the porous matrix, such as penetrating the porous matrix of the particle, or individual pore spaces within the particle may be disconnected so that fluids are substantially not capable of moving through the porous matrix, such as not being capable of penetrating the porous matrix of the particle. The degree of desired porosity interconnection may be selected and engineered into the porous particulates. Furthermore such porous particles may be selected to have a size and shape in accordance with typical fracturing proppant particle specifications (i.e., having a uniform shape and size distribution), although such uniformity of shape and size is not necessary.

One example of a synthetic porous particulate for use in this invention is the product available from Carbo Ceramics Inc. as "Econoprop." Also suitable are particles of fired kaolinitic described in U.S. Pat. No. 5,188,175 which also is incorporated herein by reference. As described in this reference such particles may include solid spherical pellets or particles from raw materials (such as kaolin clay) having an alumina content of between about 25% and 40% and a silica content of between about 50% and 65%. A starch binder also may be employed. Such particles may be characterized as having a ratio of silicon dioxide to alumina content of from about 1.39 to about 2.41, and a apparent specific gravity of between about 2.20 and about 2.60 or between about 2.20 and about 2.70.

Again, the present invention is not to be limited to any particular particulate substrate material or proppant.

Usually, the thermoplastic material can be provided onto the proppant particulate material using a warm or hot coat process in which the proppant particulate material or substrate is first heated to a temperature above the fusion or melting point of the thermoplastic material. The thermoplastic material then is added with mixing to the hot proppant particulate causing the thermoplastic material to fuse and is mixed for a sufficient period of time to coat the proppant particulates. The hot, coated proppant then is rapidly quenched to lower the temperature and yield free-flowing solids, removed from the mixer, cooled further and sieved to the desired size distribution.

In the case where an outer coating of a thermoset resin is to be applied, once the thermoplastic coating has been applied and a sufficient coating has been developed on the proppant, a thermosetting outer layer may be employed as well. The outer thermosetting resin layer is applied and eventually heat allows the thermosetting layer to achieve full cure. This procedure results in a multilayer proppant with a thermoplastic inner layer and a hard thermoset outer layer.

In an alternative coating approach, the thermoplastic material could be dissolved in a suitable solvent, or emulsified in a suitable solvent, and the thermoplastic-containing liquid then could be applied to the proppant material. Following removal of the solvent, free-flowing, thermoplastic-coated proppant particulates are recovered.

It may be suitable in many cases to subject the particulates to two or more steps of a coating procedure so as to gradually build up the thermoplastic and/or thermoset coating on the particulates.

When using porous particulates as the substrates, the apparent specific gravity of the thermoplastic-coated porous particulates is influenced by the degree of penetration of the thermoplastic coating into the porous particulates, which may be limited by disconnected porosity, such as substantially impermeable or isolated porosity, within the interior matrix of the particulate. This kind of porosity may either limit the extent of uniform penetration of the thermoplastic resin toward the core, such as producing a stratified particle cross section having an outer impervious coating with an incompletely penetrated core, or may cause uneven penetration of the thermoplastic resin to the core, such as bypassing pockets of disconnected porosity, but penetrating all the way to the core along interconnected pores. In any event, the coating of the porous proppant substrate by the thermoplastic material can be conducted in a way preferably to trap or encapsulate air (or other fluid having an apparent specific gravity less than the particle matrix, less than the resin coating and less than the well treatment fluid) within the porosity in order to control the apparent specific gravity of the coated particulate proppant at a desired amount.

Thus, in such cases the thermoplastic material coats the porous particulates (proppant) without completely invading the porosity so as to effectively encapsulate air within the porosity of the particulate proppant. Such air encapsulation preserves the lightweight character of the particulates when placed in the treating or transport fluid. Excessive penetration by the coating of thermoplastic material or incomplete coating by the thermoplastic material, which in turn allows penetration by the treating or transport fluid in use, may interfere with any objective of providing a lightweight particulate. The thermoplastic coating adds strength to the particulate proppant and facilitates the handling of the particulate proppant and preparation of the treating fluid suspension.

Treating fluids used for transporting the particulate solids into the subterranean formation in the various embodiments of the present invention can be the same as those conventionally used in prior well recovery operations. Such treating fluids include aqueous fluids, such as fresh water and brines, liquid hydrocarbon fluids, such as gasoline, kerosene, diesel and crude oil, foamed aqueous and liquid hydrocarbon fluids and emulsions. Aqueous treating fluids are generally used and preferred.

As understood by those skilled in the art, the viscosity of the treating fluid can be modified by adding a gelling agent or viscosifying agent in order to facilitate the suspension of the particulate solids (proppant). Any of the variety of gelling agents known to those skilled in the art can be utilized and the present invention is not limited to any particular chemistry for the treating fluid. Thus, gelling agents including, but not limited to, natural and derivatized polysaccharides which are soluble, dispersible or swellable in aqueous liquids and biopolymers such as xanthan, succinoglycon, modified gums such as the carboxyalkyl derivatives of guar including carboxymethylguar and the hydroxyalkyl derivatives of guar like hydroxypropylguar and modified celluloses and derivatives thereof such as carboxyethylcellulose, carboxymethylhydroxyethylcellulose, hydroxyethylcellulose, hydroxypropylcellulose and the like can potentially be used.

The coated proppant of the present invention is suspended in the treating fluid and injected into the well, often in the treating fluid that is used to fracture the well, as commonly practiced for other known proppant compositions. As well-known to those skilled in the art, the treating fluid needs to retain its viscosity until the proppant has been carried to the desired point of deposition in the well and then the fluid desirably loses its viscosity sufficiently to allow the proppant to settle in the formation. Balancing these competing attributes using the above-noted additives is well within the skill of the art and again forms no part of the present invention.

Other additives to the treatment fluid include known gel breakers, surfactants, foaming agent buffers, demulsifiers and clay stabilizers. Again, these aspects of formulating treatment fluids for well proppant treatment are well-known and do not form a specific aspect of the present invention, and thus do not require a detailed description herein. Such information is available from a wide range of public sources.

When present in the well formation, the coating of thermoplastic material on the particulate solids (proppant) softens as it is heated in the subterranean formation causing the thermoplastic material to become tacky (act as an adhesive) in the formation. By virtue of this tackiness, coated particulates adhere to one another and to other solid particulates in the formation (bridging). Agglomerates, formed by this adhesive-related process, consolidate in the formation creating a framework of particulates having sufficient permeability to allow the passage of the recovered subterranean formation fluid (e.g., petroleum). The framework of particulates, however, is sufficient to reduce or prevent the flow-back of the proppant particles and the transport of formation fines from the subterranean formation with the recovered formation fluid upon producing fluids from the formation, both because of the structure of the permeable framework itself and because of the presence of the tacky thermoplastic material within that framework.

In the broad practice of the present invention, the at least partially coated particulate material (proppant) may be mixed with all of the treating fluid introduced into the subterranean formation or it may be mixed with only that portion of the treating fluid introduced into the well formation in the final stages of the treatment to place such coated particulate (proppant) only in the formation in the vicinity of the wellbore.

For example, the coated particulates of the present invention may be included in only the final 10 to 25 percent of the particulate-containing treating fluid introduced into the formation. In this way, the coated particles act to form a tail-in to the treatment, as it is called, as agglomerates are formed in the vicinity of the wellbore to reduce or prevent backflow and the transport of fines into the well bore with any recovered formation fluids as described above.

In another embodiment of this invention, the coated particulate material is provided with an additional outer coating of a thermoset resin, i.e., a crosslinked or infusible resin.

In this embodiment, the thermoset coating provides a hard outer shell that protects the inner coating of the thermoplastic material during handling and subsequent use. In this embodiment, the character of the latent thermal adhesive property of the thermoplastic material suitable for the inner coating is enlarged to some extent, relative to the earlier disclosed embodiment, since it may not be necessary for the thermoplastic material to be tack-free under ambient conditions. Thus, the operable range of the thermal transition point temperature (TTPT) (e.g., melt point) for the thermoplastic material which is suitable for use in this specific embodiment may well be expanded at the lower end relative to the previous embodiment where the thermoplastic material comprises the outermost coating on the particulate. In particular, thermoplastic materials having a thermal transition point temperature typically in the range of 30 to 120° C. should be suitable for this particular embodiment, with a range of 60 to 100° C. more typical.

Under the pressure encountered in the subterranean formation, the hard outer shell of this embodiment cracks, thus exposing the underlying thermoplastic material, which because of conditions in the formation, has the necessary flow characteristics and adhesive character, i.e., is sticky enough, to exude through the crack and cause formation of the desired permeable framework by facilitating consolidation with other particulates in the formation, including the other coated particulates themselves.

The coated particulates in this embodiment thus have a dual coating of an inner coat of a thermoplastic material and an outer shell of a themoset material.

The coated particulates of this particular embodiment can be prepared by first coating the particulate material (proppant) at least partially with the thermoplastic material. Methods for coating the particulate material with the thermoplastic material are those same methods described above in connection with the previous embodiment. Once the thermoplastic coating has been applied then the thermoset coating is prepared. This coating is prepared by coating the previously thermoplastic-coated particulates (proppants) with a coating of a thermosetting resin and then cross-linking that resin to form the thermoset shell.

Suitable thermosetting resins for forming the outer shell include phenol-formaldehyde resole resins (such as GP-2086 and 761D31, available from Georgia-Pacific), phenol-formaldehyde novolac resins mixed with a cross-linking agent such as hexamine (resins such as GP-2110, GP-2202 and GP-298G87), epoxy resins, and other similar materials. GP-2086 is a liquid phenolic resole resin, and GP-761D31 is a liquid phenolic resole resin in methanol. GP-2110 is a liquid phenolic novolac resin in methanol, and GP-2202 is a flaked phenolic novolac resin.

Coating the thermoplastic-coated particulates with a thermosetting resin can be accomplished using a variety of techniques known to those skilled in the art. The thermosetting resin can be supplied dissolved in a suitable solvent, which depending on the resin could be water, an organic solvent or some combination thereof. The thermosetting resin also can be supplied as an emulsion, such as a dispersion of a resole resin in an aqueous continuous phase. Suitable coating techniques are taught in U.S. Pat. Nos. 5,422,183 and 4,585,064, which are incorporated herein in their entirety by reference. The cure speed of the thermosetting resin selected for this application should be sufficiently rapid so that a full cure is obtained for the outer coating is as short a time period as possible without adversely impacting the integrity of the underlying thermoplastic layer or layers. Selecting an appropriate resin is within the skill of the art.

The amount of thermosetting resin to apply as a coating depends upon the particular thermosetting resin used and the size of the thermoplastic-coated particulates. Generally, the thermosetting resin is used in an amount of 1% to about 4% by weight of the thermoplastic-coated particulates. It is preferred to use an amount of thermosetting resin to completely encase the thermoplastic-coated particulates and provide a coating of about 0.5 to 3 mils in thickness.

As with the earlier described thermoplastic-coated particulates (proppants), the dual layer coated (or multi-layer coated) particulate materials can be used as a proppant material in fracturing treatments performed in a subterranean formation, or in gravel packing procedures. The dual layer coated (or multi-layer coated) particulate materials also can be used, just as the thermoplastic coated particulates, in forming a synthetic region of a controlled permeability within a subterranean zone.

It will be understood that while the invention has been described in conjunction with specific embodiments thereof, the foregoing description and following examples are intended to illustrate, but not limit the scope of the invention. Other aspects, advantages and modifications will be apparent to those skilled in the art to which the invention pertains, and these aspects and modifications are within the scope of the invention.

Example 1

A proppant material (sand or porous ceramic) is added to a heated mixer (mill) and allowed to equilibrate at a temperature of about 232° C. (450° F.). Thereafter, a hot melt resin in an amount of about 6% by weight of the weight of the proppant is added to the mixer (mill) as a free flowing powder. The material is mixed for one minute and then cooling water is added to quench the temperature and is allowed to mix until the temperature has been reduced sufficiently to provide a free-flowing particulate material, which is removed and sized as desired.

Example 2

3,000 grams of proppant substrate, a 20/40 mesh frac grade silica sand from US Silica, were added to a heated electric mixer and allowed to equilibrate at a temperature of 251° C. (485° F.). 60 grams of NovaRes™ 1100 (a pentaerythritol ester of tall oil rosin having a softening point in the range of about 96-103° C.) were added to the preheated sand and allowed to mix for thirty seconds. An outer coat of GP-2202, a flaked phenol-formaldehyde novolac resin, was applied by adding 120 grams of GP-2022 and mixing for an additional thirty seconds. At this point, 18 grams of powdered hexamine were added as a cross-linker and mixing was continued for an additional two minutes to cure the outer layer. The coated proppant was discharged, screened and cooled.

This coated proppant was subjected to 8,000 psi pressure for several minutes at room temperature (20° C.), then the pressure was removed and material extracted, it was in the form of free flowing grains.

Another sample of the above-described coated proppant was preheated in the crush cell at 105° C. and then was subjected to 8,000 psi for several minutes. Upon removing the pressure and extracting the proppant, the material came out in a solid rigid pellet. In this case, the cured outer layer cracked under the pressure and allowed the tacky thermoplastic underlay to ooze out and bond to neighboring proppant grains.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim as follows:

1. A coated proppant comprising:
    (a) a particle;
    (b) an inner thermoplastic coating on the particle, the thermoplastic coating comprising a hot melt adhesive; and
    (c) an outer thermoset coating surrounding and completely encasing the inner thermoplastic coating comprising the hot melt adhesive.

2. The coated proppant of claim 1, wherein the particle is a sand, a naturally occurring mineral fiber, a ceramic, a bauxite, a glass, a metal bead, or a walnut hull.

3. The coated proppant of claim 1, wherein the particle is a porous ceramic or porous polymer particle.

4. The coated proppant of claim 1, wherein the particle has a mesh size between about 8 and about 100, based on the U.S. Standard Sieve Series.

5. The coated proppant of claim 1, wherein the hot melt adhesive has a thermal transition point temperature in the range of about 30 to about 120° C.

6. The coated proppant of claim 1, wherein the hot melt adhesive has a thermal transition point temperature in the range of about 60 to about 100° C.

7. The coated proppant of claim 1, wherein the hot melt adhesive comprises a pine rosin or a rosin ester.

8. The coated proppant of claim 1, wherein the thermoplastic coating is from about 1% to about 8% by weight of the particle.

9. The coated proppant of claim 1, wherein the thermoplastic coating on the particle has a thickness in a range from about 0.5 to about 3 mils.

10. The coated proppant of claim 1, wherein the thermoset coating comprises a phenol-formaldehyde resin.

11. The coated proppant of claim 1, wherein the thermoset coating comprises a mixture of a phenol-formaldehyde novolac resin and a crosslinking agent.

12. The coated proppant of claim 11, wherein the crosslinking agent is hexamine.

13. The coated proppant of claim 1, wherein the thermoset coating is from about 1% to about 4% by weight of the thermoplastic-coated particle.

14. The coated proppant of claim 1, wherein the thermoset coating surrounding the inner thermoplastic coating has a thickness in a range from about 0.5 to about 3 mils.

15. A coated proppant comprising:
    (a) a particle;
    (b) an inner thermoplastic coating on the particle, wherein the thermoplastic coating comprises a pine rosin or a rosin ester; and
    (c) an outer thermoset coating surrounding the inner thermoplastic coating, wherein the thermoset coating comprises a phenol-formaldehyde resole resin or a mixture of a phenol-formaldehyde novolac resin and a crosslinking agent.

16. The coated proppant of claim 15, wherein the thermoplastic coating comprises a glycerol rosin ester or a pentaerythritol rosin ester.

17. A method of making the coated proppant of claim 15, the method comprising:
(a) applying the inner thermoplastic coating onto the particle to obtain a thermoplastic-coated particle; and
(b) applying an outer thermoset coating surrounding the thermoplastic-coated particle to obtain the coated proppant.

18. The method of claim 17, wherein the thermoplastic coating comprises a glycerol rosin ester or a pentaerythritol rosin ester.

19. A method of using the coated proppant of claim 15 to treat a subterranean formation, the method comprising:
(a) introducing a fluid suspension of the coated proppants to the subterranean formation;
(b) depositing the coated proppants in the subterranean formation;
(c) subjecting the coated proppants to an increase in temperature and pressure sufficient to break the outer thermoset coating to expose the inner thermoplastic coating; and
(d) agglomerating the thermoplastic coating of the coated proppants to form a stable framework of proppant particles.

20. The method of claim 19, wherein the thermoplastic coating comprises a glycerol rosin ester or a pentaerythritol rosin ester.

21. A coated proppant comprising:
(a) a particle;
(b) an inner thermoplastic coating on the particle, the thermoplastic coating capable of developing a tacky character at a temperature encountered in a subterranean formation; and
(c) an outer thermoset coating surrounding and completely enveloping the inner thermoplastic coating such that only upon fracturing of the outer thermoset coating is any tackiness developed by the inner thermoplastic coating exposed.

22. The coated proppant of claim 21, wherein the particle is a sand, a naturally occurring mineral fiber, a ceramic, a bauxite, a glass, a metal bead, or a walnut hull.

23. The coated proppant of claim 21, wherein the particle is a porous ceramic or porous polymer particle.

24. The coated proppant of claim 21, wherein the thermoplastic coating has a thermal transition point temperature in the range of about 30 to about 120° C.

25. The coated proppant of claim 24, wherein the thermoplastic coating is from about 1% to about 8% by weight of the particle.

26. The coated proppant of claim 25, wherein the thermoset coating comprises a phenol-formaldehyde resin.

27. The coated proppant of claim 26, wherein the thermoset coating surrounding the inner thermoplastic coating has a thickness in a range from about 0.5 to about 3 mils.

28. The coated proppant of claim 25, wherein the thermoset coating comprises a mixture of a phenol-formaldehyde novolac resin and a crosslinking agent.

29. The coated proppant of claim 28, wherein the crosslinking agent is hexamine.

30. The coated proppant of claim 28, wherein the thermoset coating surrounding the inner thermoplastic coating has a thickness in a range from about 0.5 to about 3 mils.

* * * * *